United States Patent
Zhang et al.

[19]

[11] Patent Number: 6,111,769
[45] Date of Patent: Aug. 29, 2000

[54] EXTERNAL DRIVING CIRCUIT FOR BRIDGE TYPE SYNCHRONOUS RECTIFICATION

[75] Inventors: Jun Zhang, Garland; William Hart, Plano, both of Tex.

[73] Assignee: Ericsson, Inc., Richardson, Tex.

[21] Appl. No.: 09/405,372

[22] Filed: Sep. 24, 1999

[51] Int. Cl.$^7$ .............. H02M 7/68; H02M 7/00; H02M 7/217

[52] U.S. Cl. ............................ 363/127; 363/89

[58] Field of Search ................. 363/84, 89, 125, 363/127

[56] References Cited

U.S. PATENT DOCUMENTS

| | | | |
|---|---|---|---|
| 4,903,181 | 2/1990 | Seidel | 363/16 |
| 5,075,839 | 12/1991 | Fisher et al. | 363/48 |
| 5,119,284 | 6/1992 | Fisher et al. | 363/48 |
| 5,742,491 | 4/1998 | Bowman et al. | 363/21 |
| 5,896,043 | 4/1999 | Kumagai | 326/68 |
| 5,952,847 | 9/1999 | Plants et al. | 326/80 |

*Primary Examiner*—Peter S. Wong
*Assistant Examiner*—Bao Q. Vu
*Attorney, Agent, or Firm*—Arthur I. Navarro

[57] ABSTRACT

An external driving circuit (21) for a bridge type synchronous rectifier circuit (20) having a first and second first synchronous rectifier (Q3,Q4), a primary driving circuit (14), and a pair of totem pole drivers (16,18). The timing signal for the first and second synchronous rectifiers (Q3, Q4) is derived from the external driving circuit (21). The external driving circuit (21) includes a first and second switch drivers (22,24). The external driving circuit (21) is interfaced with the synchronous rectifier circuit (20) by connecting first and second switch drivers (22,24) to the totem pole drivers (16,18). The first and second switch drivers (22,24) provides storage for circuit current which is fully discharged at the appropriate time to facilitate turning on and off the synchronous rectifiers (Q3,Q4).

18 Claims, 5 Drawing Sheets

6,111,769

EXTERNAL DRIVING CIRCUIT FOR BRIDGE TYPE SYNCHRONOUS RECTIFICATION

TECHNICAL FIELD

This invention relates generally to logic integrated circuits and more particularly, to a simplified external driving circuit for synchronous rectification for a DC-to-DC power converter, easily adapted to various bridge type topologies. More particularly, the present invention provides a scheme for synchronous rectification that simplifies the complexity of the timing circuitry.

BACKGROUND OF THE INVENTION

As logic integrated circuits have migrated to lower working voltages in the surge for higher operating frequencies and as overall system sizes have continued to decrease, power supply designs with smaller and higher efficiency power modules are in demand. In an effort to improve the efficiencies and increase power densities, synchronous rectification has become necessary for these types of applications. Synchronous rectification has gained great popularity in the last ten years as low voltage semiconductor devices have advanced to make this a viable technology.

Synchronous rectification refers to using active devices such as the MOSFET as a replacement for shocky diodes as rectifier elements in circuits. Recently, self-driven synchronous schemes have been widely adopted in the industry as the desired method for driving the synchronous rectifiers in DC-to-DC modules for output voltages of five volts and below. Most of these self-driven schemes are designed to be used with a very particular set of topologies commonly known as "D,1-D" (complimentary driven) type topologies. In these types of converters, the power transformer signal in the secondary winding has a correct shape and timing to directly drive the synchronous rectifiers with minimum modifications.

In topologies such as the hard switched Half Bridge (HB) and Full Bridge (FB) rectifiers and in push-pull topologies, the transformer voltage has a recognizable zero voltage interval making it undesirable to implement self-driven synchronous rectification. Using the transformer voltage to drive the synchronous rectifiers results in conduction of the parasitic anti-parallel diode of the MOSFETs used for the synchronous rectifiers for a significant portion of the free willing interval, negatively effecting the efficiency of the module, which is undesired. As a result, it is necessary to use an external drive circuit with these circuit topologies. In these implementations, the resonant reset interval has been adjusted to provide the correct gate drive signal during the free willing interval. Therefore, the externally driven implementation offers a better solution for synchronous rectification in many instances. However, the prior art externally driven synchronous rectification is both complex and costly.

Traditionally, the external driving circuit of a bridge-type synchronous rectification DC-to-DC converter includes a center tapped gate drive, an integrated circuit which inverts the timing signal, as necessary, and drives the synchronous rectifiers, and a pair of totem pole drivers. The center tap of such a driving circuit results in an extra terminal which increases the size of the transformer and also increases cost. The integrated circuit needed for the driver also increases cost and lessens the reliability of the circuit as more parts are needed for driving the synchronous rectifier circuit. Thus, what is needed is a simplified external driving circuit for bridge-type synchronous rectification which is both physically smaller and less costly.

SUMMARY OF THE INVENTION

The present invention achieves technical advantages as an external driving circuit for bridge-type synchronous rectification that can be easily adapted to bridge-type topologies, but particularly adaptable to push-pull, half bridge and full bridge converters.

In one embodiment, disclosed is an external driving circuit for synchronous rectification for a DC-to-DC power converter. The driving circuit, which is particularly a DC level shifter, is designed to work with a synchronous rectification circuit having a first and second synchronous rectifiers and a first and second totem pole drivers. The driving circuit itself includes a first switch driver which is coupled to the first totem pole driver and a second switch driver which is coupled to the second totem pole driver. The first and second switch drivers transfer the timing signal to turn on and off the first and second synchronous rectifiers through the totem pole drivers to the first and second synchronous rectifiers. This design, utilizing first and second switch drivers, allows the center tapped gate drive of the prior art driving circuit to be eliminated, thus, decreasing the size of the gate drive transformer and decreasing cost.

The first and second switch drivers comprise a capacitor which provides storage for circuit current. The drivers also include a resistor, which is coupled in parallel to the capacitor such that the capacitance of the capacitor can be fully discharged or bled. Furthermore, a diode is coupled to the transformer, allowing the first and second switch drivers to provide the appropriate timing to turn on and turn off the synchronous rectifiers. The composition of the first and second switch drivers allows for a less costly solution by eliminating the integrated circuit driver of the prior art driving circuit. Because the integrated circuit driver has many components which increases unreliability, the simplified composition of the first and second switch drivers allows for a more reliable circuit.

Also disclosed is a method of rectifying a varying DC signal of a DC—DC power converter using an external driving circuit for a synchronous rectifier circuit having a primary transformer, a pair of primary switches, a first and second synchronous rectifier, an external drive circuit, and an output terminal. The method comprises the steps of providing a varying DC signal to the external drive circuit to provide the turn on and turn off timing for the first and second synchronous rectifiers, transferring the timing signal to the external driving circuit, processing the signal in the external driving circuit, and providing the processed signal to the first and second synchronous rectifiers.

BRIEF DESCRIPTION OF THE DRAWINGS

The above features of the present invention will be more clearly understood from consideration of the following descriptions in connection with accompanying drawings in which.

DETAILED DESCRIPTION OF PREFERRED EMBODIMENT

The following is a description of the structure of the circuit and corresponding method of the present invention. In particular, a prior art synchronous rectifier circuit will be discussed first, followed by a description of the preferred embodiment of the present invention, and a discussion of the advantages.

Figure 1:
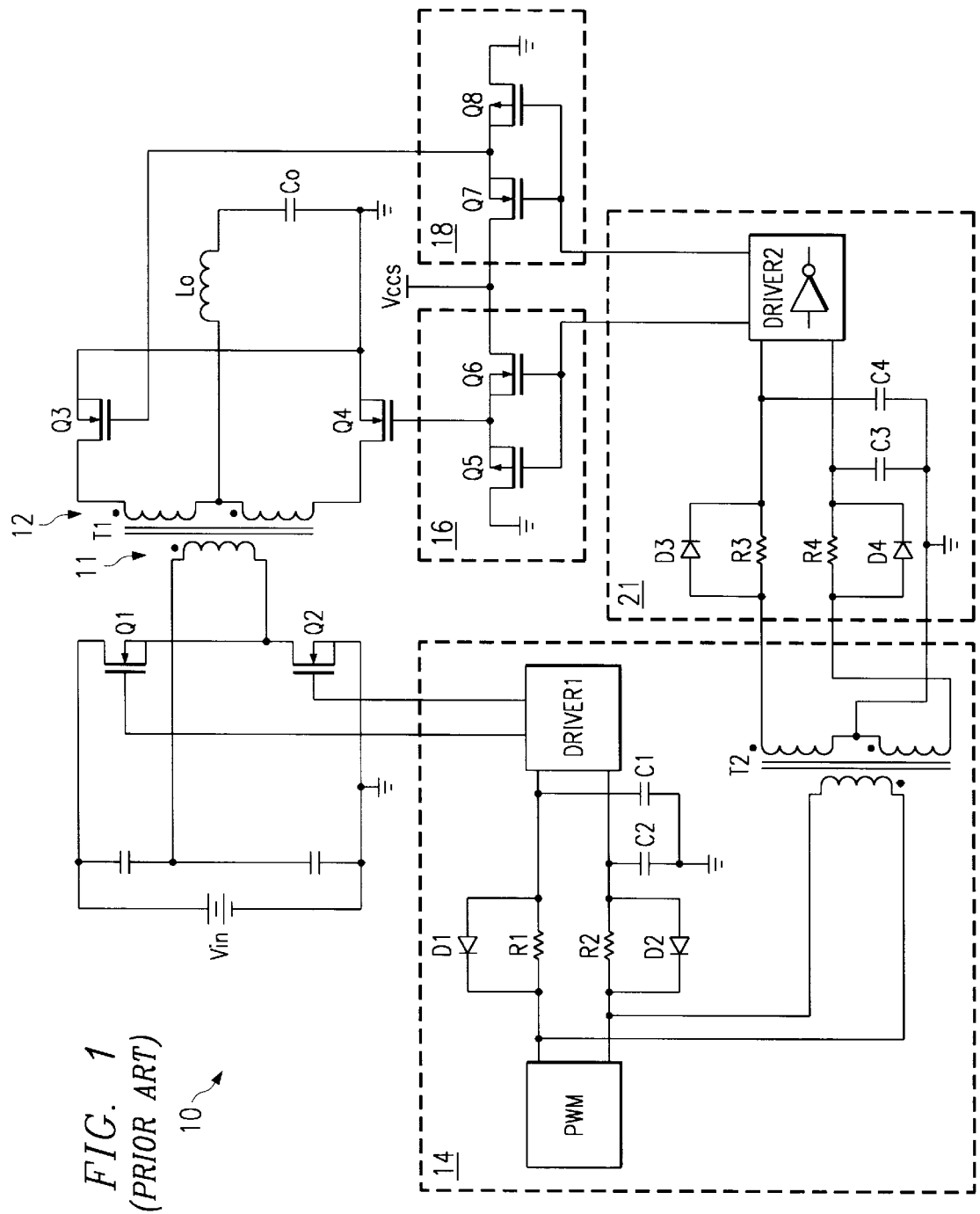
FIG. 1 illustrates a conventional driving circuit of the prior art for a bridge-type synchronous rectification DC-to-DC converter.

Referring to FIG. 1, therein is illustrated an externally-driven half-bridge synchronous rectification circuit 10 of the prior art. The circuit 10 includes a first and second synchronous rectifiers Q3 and Q4, respectively, coupled to the secondary winding 12 of the transformer T1 and to first and second totem pole drivers 18 and 16, respectively. Preferably, the switches Q5, Q6, Q7, and Q8 of the totem pole drivers 16 and 18 are MOSFETs smaller than the MOSFETs used as synchronous rectifiers Q3 and Q4. Also shown are primary switches Q1 and Q2 connected to the external driver 14. The timing signals for the first and second synchronous rectifiers Q3 and Q4 are derived from the external driver 14 and the DC level shifter 21, as described below. The external driver includes a second transformer T2, having a primary and secondary winding each comprising a first and second terminal, to transfer timing signals generated by the external driver 14 to the DC level shifter 21. The secondary winding is center taped resulting in a third terminal on the secondary winding.

The external driver 14 further comprises resistors R1 and R2 and capacitors C1 and C2 which generate a delay that allows the appropriate synchronous rectifier Q3 or Q4 to turn off before the primary switch Q1 or Q2 turns on. The DC level shifter 21 includes resistors, labeled R3 and R4, and capacitors, labeled C3 and C4, which generate the delay needed to allow the appropriate synchronous rectifier Q3 or Q4 to turn on after the primary switch Q1 or Q2 turns off. When capacitor C1 is charged up, primary switch Q1 is on. The voltage on the dot end or second terminal of the primary transformer is high. Capacitor C4 is coupled to the second terminal of the second transformer T2 which results in the voltage of capacitor C4 being high. This would normally result in Q4 being high, but the driver2 is an inverted driver, thus the gate voltage of Q4 is low resulting in Q4 being off. At this time the voltage of the node of R3 and C3 is negative which, when inverted, results in Q3 being on. When Q1 is off, the gate transformer is shorted. The voltages of C3 and C4 are zero. Both of Q3 and Q4 are on. The converter is then in the freewheeling stage which is compensated for by the prior art design, exemplified by circuit 10.

While the prior art rectifier circuit 10 provides the necessary timing for the synchronous rectifiers Q3 and Q4 to ensure correct on and off switching, these implementations are both complex and expensive. The center tap of the secondary winding of second transformer T2 introduces an extra terminal which increases the size of the circuitry. This in turn results in increased costs. Furthermore, the integrated circuitry driver2 which inverts the timing signals to the first and second synchronous rectifiers Q3 and Q4 is complex and requires many components and thus decreases reliability. Consequently, costs are driven up even further. The present invention provides a simplified implementation of the externally-driven driving circuit where the circuit's complexity and cost have been reduced. Furthermore, the present invention provides other advantages including having a design that facilitates paralleling multiple converters.

Figure 2:
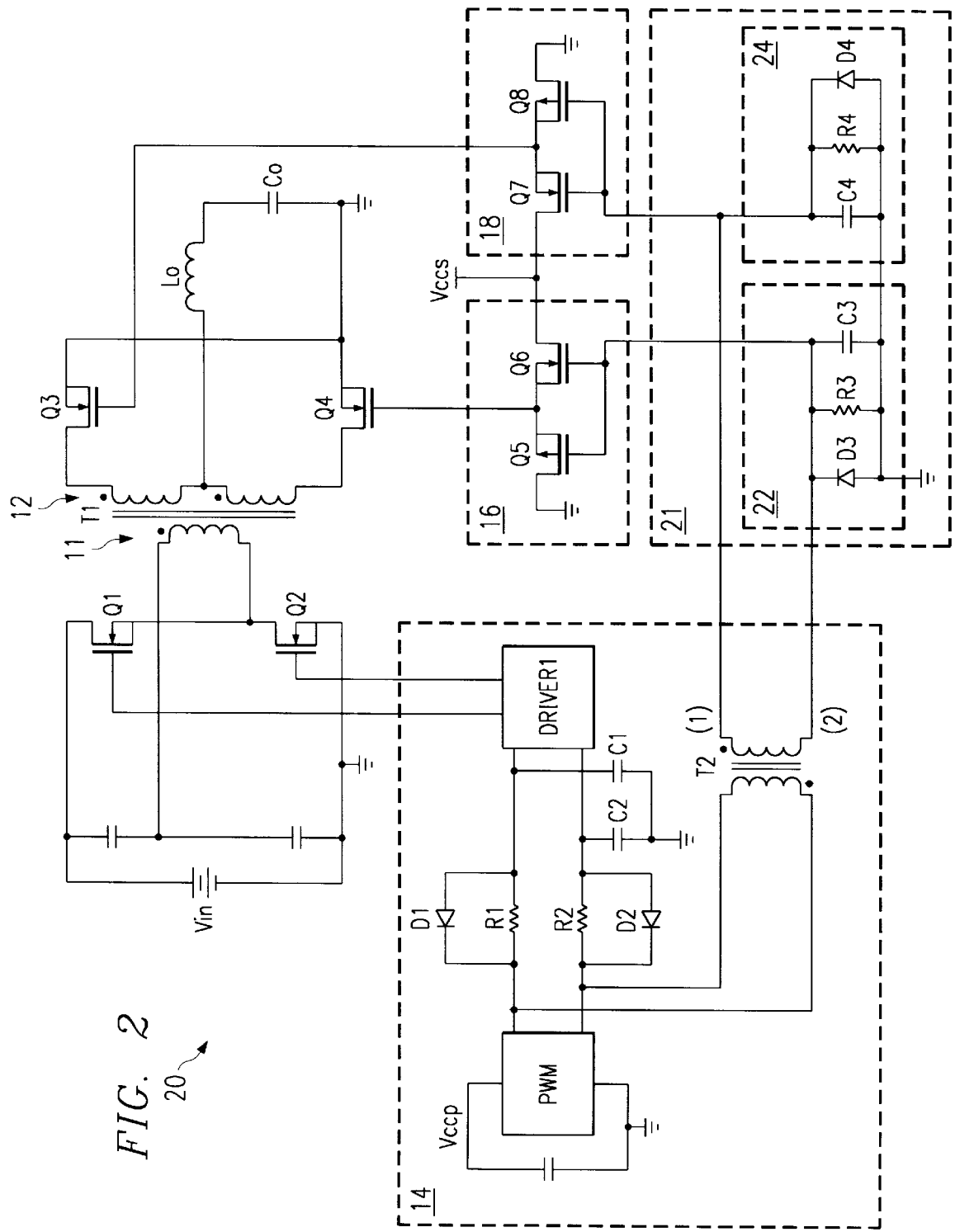
FIG. 2 shows the external driving circuit of the present invention for a half bridge synchronous rectification DC-to-DC converter.

In particular, the present invention provides a less complex and costly solution as compared to the prior art synchronous rectifier circuit 10 by redesigning the DC level shifter 21. The DC level shifter 21 of the present invention comprises first and second switch drivers 16 and 18, respectively, as shown in the half-bridge synchronous rectifier circuit 20 of FIG. 2. The switch drivers 16 and 18 provide the appropriate timing signal to the synchronous rectifiers Q3 and Q4 and eliminates the driver2 of the prior art. The cost and size of the synchronous rectifier circuit 20 is thus decreased while the reliability of the circuit 20 is increased.

According to the present invention, synchronous rectifiers Q3 and Q4 are turned on and off when the voltages of the switch drivers 16 and 18 are charged and discharged. Synchronous rectifier Q3 is turned on and off by first switch driver 22 which sends the necessary signal to the first totem pole driver 16 which is directly connected to synchronous rectifier Q3. The totem pole driver 16 may be utilized to provide high peak current to the synchronous rectifier Q3. The on-resistance of the n-channel MOSFET Q6 of the first totem-pole driver 16 and the gate capacitance of synchronous rectifier Q3 are designed to allow the synchronous rectifier Q3 to turn on after the primary switch Q1 turns off. By selecting the on-resistance of the MOSFET Q6 or by placing a resister in series with this switch, the delay time can be controlled. The second totem pole driver 18 which has an N-channel MOSFET Q7 and the gate capacitance of synchronous rectifier Q4 are also designed to allow the synchronous rectifier Q4 to turn on after the primary switch Q2 turns off.

First switch driver 22 comprises a first capacitor C3 which provides storage of the circuit current to be discharged at the appropriate time in order to switch the synchronous rectifier Q3 on. A first resistor R3 is provided to facilitate fully discharging or bleeding the first capacitor C3. In practical applications, a capacitor may not completely discharge, thus a resistor is added to bleed the capacitor as done in the present invention. A first diode D3 provide current paths depending of the signal swing at the second terminal (2) on the secondary winding of the second transformer T2. The second switch driver 24 includes a second capacitor C4, a second resistor R4, and a second diode D4 which operate in the same manner as discussed above for the first capacitor, resistor, and diode of the first switch driver 22.

In operation, when primary switch Q1 is on, the voltage at terminal (1) on the secondary winding of second transformer T2 is high. Terminal (2) is clamped to ground by first diode D3. First capacitor C4 is charged up, thus synchronous rectifier Q3 is on and synchronous rectifier Q4 is off. When primary switch Q1 turns off, the voltage across terminal (1) is zero. During this interval, the second capacitor C4 is discharged to first capacitor C3 through the shorted winding until they reach the same voltage. The voltage of first capacitor C3 and second capacitor C4 are equal to half of the voltage originally on second capacitor C4. This voltage is high enough to turn on synchronous rectifiers Q3 and Q4. At this time the converter is in freewheeling stage.

An additional advantage of the present external driving circuit 21 is that multiple converters can be paralleled with no modification of the driving circuit 21 and without shorting the output bus of the synchronous rectifier circuit 20. The prior art driving circuit shown in FIG. 1 can not be paralleled without an oring diode. Furthermore, in the prior art, if paralleled converters do not start at same time, the converter that doesn't start will short the output bus. When the converter doesn't switch, then both inputs to the driver2 are low. This results in both outputs of the driver2 going high, thus both of the synchronous rectifiers Q3 and Q4 are turned on, shorting the bus.

When multiple converters are paralleled in the present invention and a converter is not switching, there is no signal from the external drive second transformer T2, thus both of the totem pole drivers 16 and 18 are off, resulting in both of the synchronous rectifiers Q3 and Q4 being off. The output bus is thus protected from shorting. With an active current sharing circuit of the present invention, the converter in parallel will share the current equally.

Figure 3:
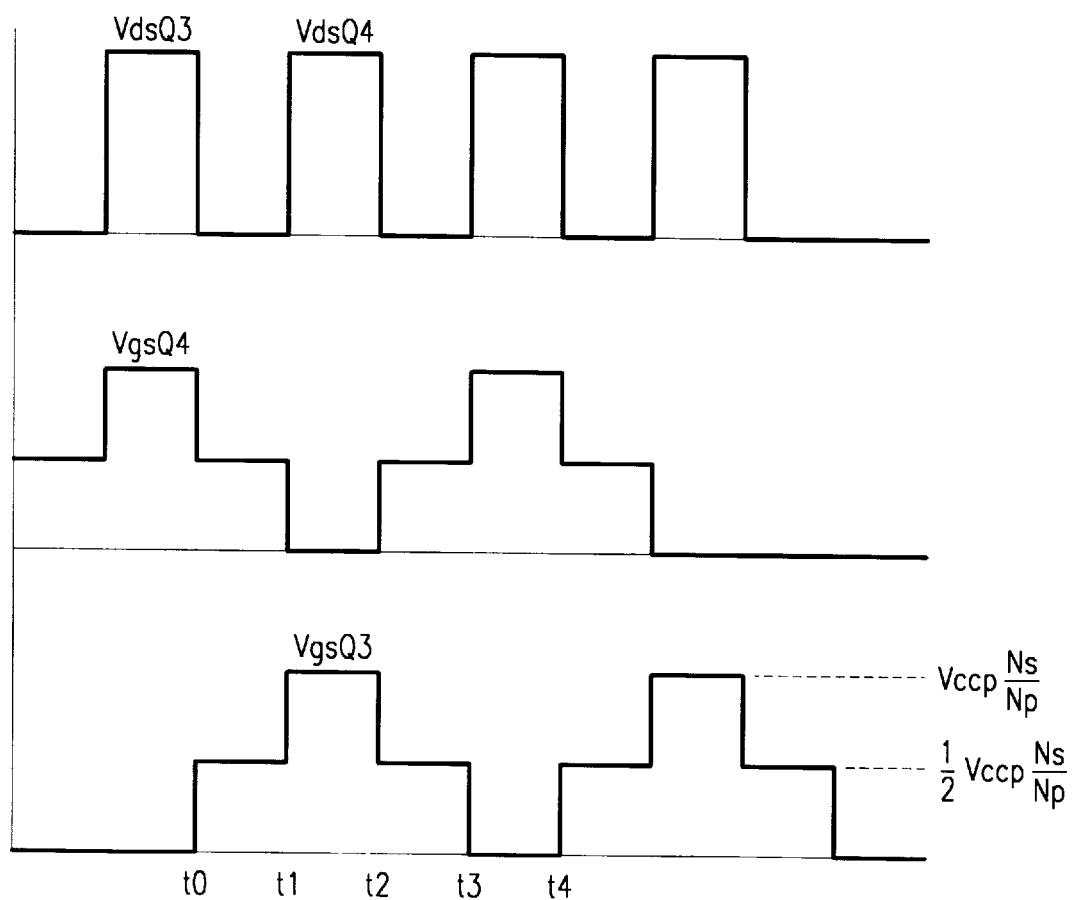
FIG. 3 shows the voltage wave forms for the drain and gate of the synchronous rectifiers.
Figure 4:
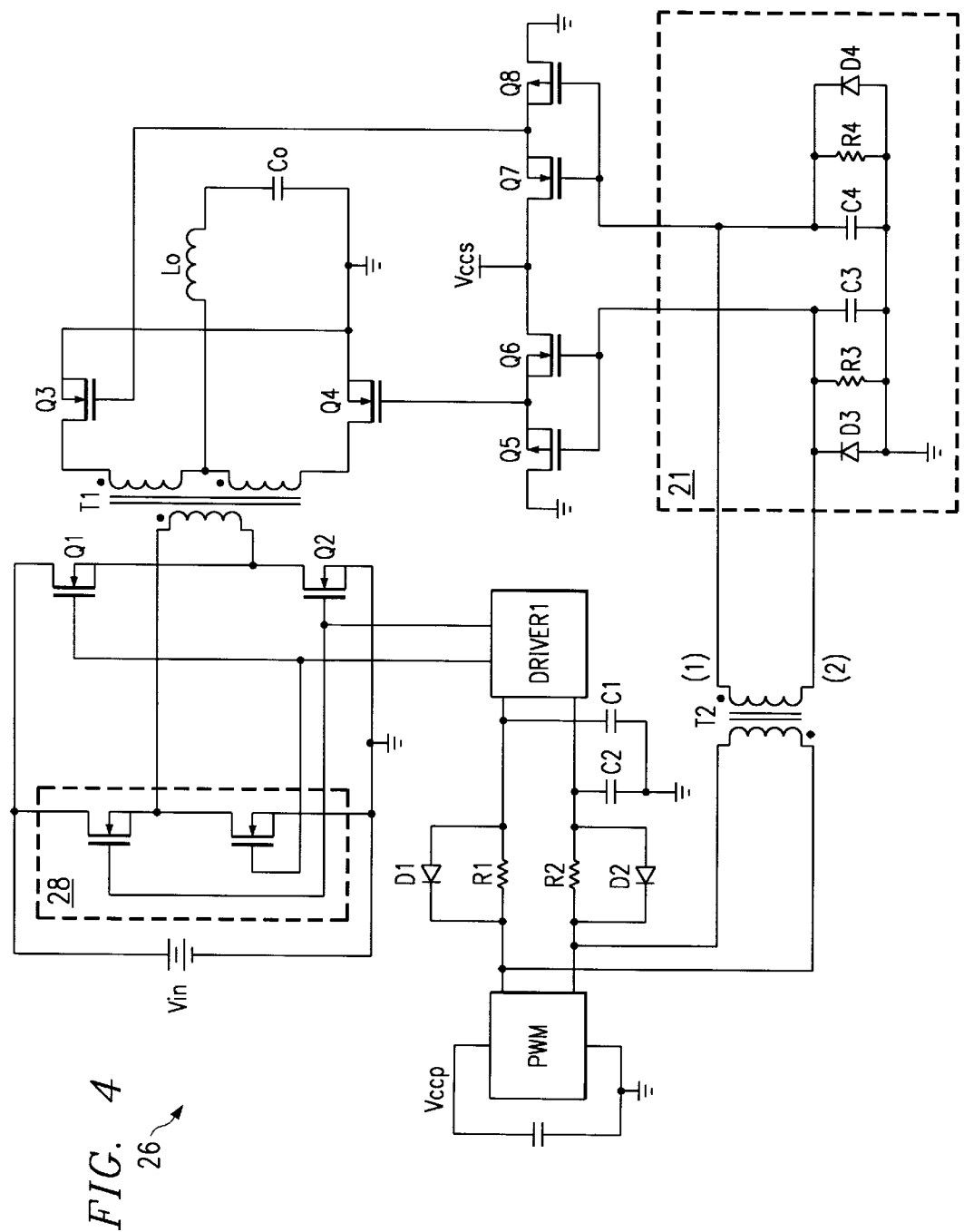
FIG. 4 shows a full bridge DC-to-DC converter utilizing the external driving circuit of the present invention.
Figure 5:
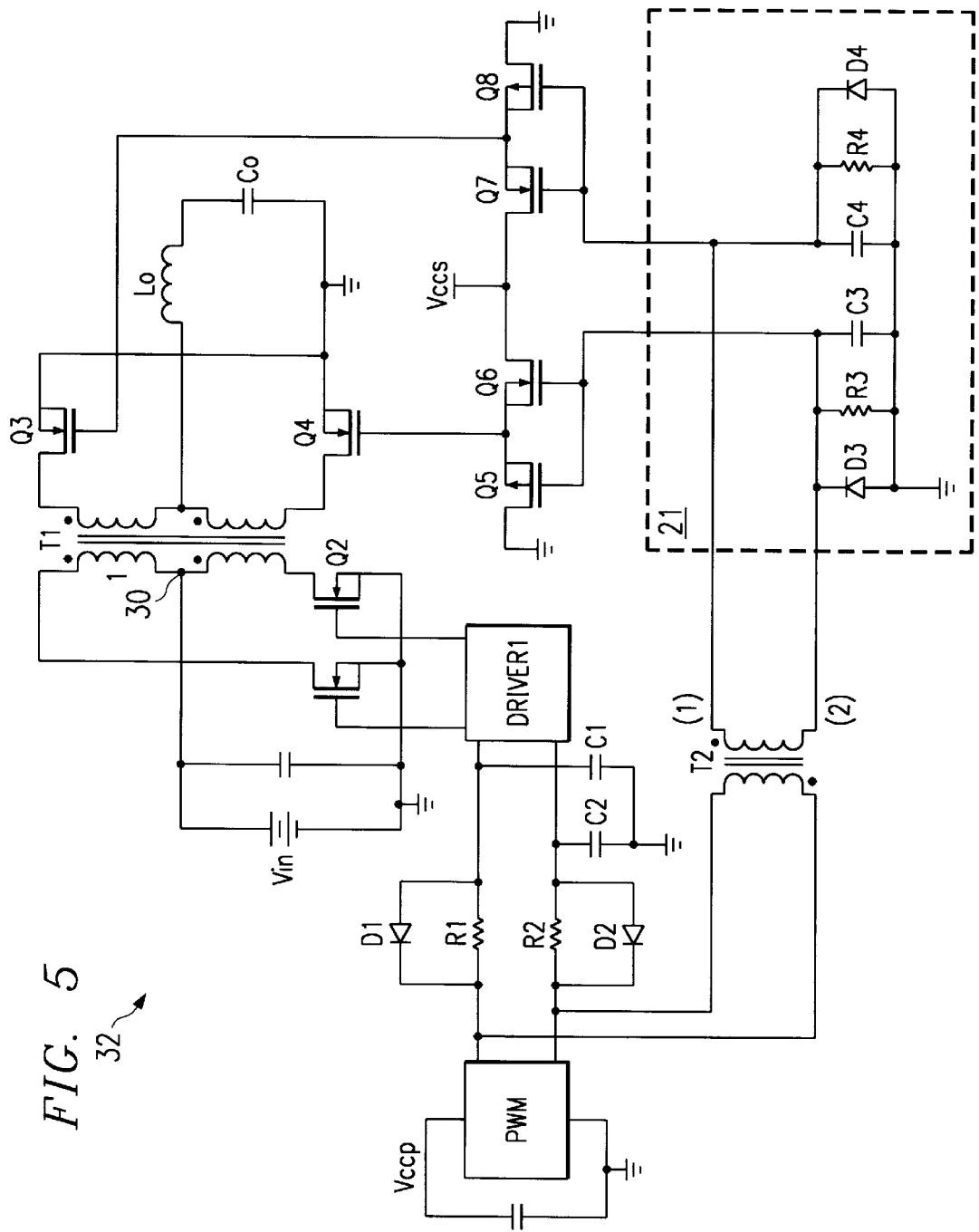
FIG. 5 shows a push-pull converter utilizing the external driving circuit of the present invention.

FIG. 3 shows the basic voltage waveforms on the drains and gates of Q3 and Q4, where Vccp is the primary basing voltage and Ns/Np is the gate transformer turns ratio. The embodiment of the driving circuit of the present invention for a half bridge rectifier has been shown. However, the present invention can be implemented for the full-bridge and push-pull topologies. FIG. 4 shows the driving circuit of the present invention for the full-bridge rectifier 26. FIG. 5 shows the driving circuit of the present invention for the push-pull rectifier 32. Those of ordinary skill will recognize that the external driving circuit 21 remains the same in each topology, simplifying the overall design and reducing the cost of the synchronous rectifier scheme employed.

The present invention also embodies a method of rectifying a varying DC signal of a DC—DC power converter using the external driving circuit for a synchronous rectifier circuit having a primary transformer, a pair of primary switches, a first and second synchronous rectifier, an external drive circuit, and an output terminal. The method includes the steps of providing a varying DC signal to said external drive circuit 21 to provide the turn on and turn off timing for said first and second synchronous rectifiers Q3 and Q4 and transferring the timing signal to the external driving circuit 21. The external driving circuit 21 of the present invention will process the signal using capacitors C3 and C4 for storage of the current to be discharged at the proper time to drive the voltage across the synchronous rectifiers low or high to turn off or turn on the synchronous rectifiers Q3 and Q4. The signal is then provided to the first and second synchronous rectifiers Q3 and Q4 via the totem pole drivers 16 and 18.

The novel method and system of the present external driving circuit provides the advantage of cost effectively driving the synchronous rectifiers Q3 and Q4. Another advantage of the present invention is the reduction in physical size of the synchronous rectifier circuit. Yet another advantage of the present invention is the adaptability of the present invention to be used in paralleling multiple converters.

While the invention has been described with reference to illustrative embodiments, this description is not intended to be construed in a limiting sense. Various modifications in combinations of the illustrative embodiments, as well as other embodiments of the invention, will be apparent to persons skilled in the art upon reference to the description. The synchronous rectifiers Q3 and Q4 and switches Q5, Q6, Q7, and Q8 are shown as MOSFETs; however, it is contemplated that another type of FET or switching device would be suitable for use in the present invention. It is therefore intended that the appended claims encompass any such modifications or embodiments.

What is claimed is:

1. A synchronous rectifier circuit for a bridge type DC-to-DC converter comprising:

a primary transformer having a primary and a secondary winding, said secondary winding having a first and a second terminal;

a first and a second synchronous rectifier operably coupled to said first and second synchronous terminals of said secondary winding, wherein said first and second synchronous rectifiers are MOSFETS;

a first and a second totem pole driver operably coupled to said first and second synchronous rectifiers to provide current drain;

an external driver including a timing circuit and a transformer with a primary winding and a secondary winding, said secondary winding including a first and a second terminal, said timing circuit operably coupled to said primary winding; and a DC level shifter circuit including a first and a second switch driver coupled to said first and second terminals of said secondary winding of said external driver, respectively, said first switch driver having a first capacitor having a first and a second end, said first capacitor providing storage for circuit current, a first resistor coupled in parallel to said first capacitor whereby the capacitance of said first capacitor is fully discharged, and a first diode coupled to said secondary winding of said transformer, said first switch driver coupled to said first totem pole driver;

wherein said DC level shift circuit is connected to said first and second totem pole drivers whereby said timing signal to turn on and turn off said first and second synchronous rectifiers is transferred from said first and second switch drivers through said first and second totem pole drivers to said first and second synchronous rectifiers, and whereby said first switch driver provides the appropriate timing to turn on and off said first synchronous rectifier.

2. A synchronous rectifier circuit for a bridge type DC-to-DC converter comprising:

a primary transformer having a primary and a secondary winding, said secondary winding having a first and a second terminal;

a first and a second synchronous rectifier operably coupled to said first and second synchronous terminals of said secondary winding, wherein said first and second synchronous rectifiers are MOSFETS;

a first and a second totem pole driver operably coupled to said first and second synchronous rectifiers to provide current drain;

an external driver including a timing circuit and a transformer with a primary winding and a secondary winding, said secondary winding including a first and a second terminal, said timing circuit operably coupled to said primary winding; and a DC level shifter circuit including a first and a second switch driver coupled to said first and second terminals of said secondary winding of said external driver, respectively, said second switch driver having a second capacitor having a first and a second end, said second capacitor providing storage for circuit current, a second resistor coupled in parallel to said second capacitor whereby the capacitance of said second capacitor is fully discharged, and a second diode coupled to said secondary winding of said transformer, said second switch driver coupled to said second totem pole driver;

wherein said DC level shift circuit is connected to said first and second totem pole drivers whereby said timing signal to turn on and turn off said first and second synchronous rectifiers is transferred from said first and second switch drivers through said first and second totem pole drivers to said first and second synchronous rectifiers and whereby said second switch driver provides the appropriate timing to turn on and off said second synchronous rectifier.

3. The synchronous rectifier circuit according to claim 1 wherein said first totem pole driver comprises a first and a second switch whereby said first synchronous rectifier is switched on and off.

4. The synchronous rectifier circuit according to claim 3 wherein said second totem pole driver comprises a third and a fourth switch whereby said second synchronous rectifier is switched on and off.

5. The synchronous rectifier circuit according to claim 5 wherein said first and second switches arc MOSFETS.

6. The synchronous rectifier circuit according to claim 4 wherein said third and fourth switches are MOSFETS.

7. The synchronous rectifier circuit according to claim 2 wherein said first end of said second capacitor is connected to said first terminal of said transformer of said external circuit, whereby said second capacitor is discharged to turn on said first and second synchronous rectifiers.

8. The synchronous rectifier circuit according to claim 1 wherein said first end of said first capacitor is connected to said second terminal of said transformer of said external circuit, whereby said first capacitor is charged to turn on said first and second synchronous rectifiers.

9. A driving circuit for a bridge type synchronous rectification circuit having a first and second synchronous rectifier, a pair totem pole drivers, an external driver including a timing circuit operably coupled to said primary winding and transformer with a primary winding and a secondary winding, said secondary winding including a first and second terminals, and an output bus, said driving circuit comprising:

a first switch driver having a first capacitor having a first and second end, said first capacitor providing storage for circuit current, a first resistor coupled in parallel to said first capacitor whereby the capacitance of said first capacitor is fully discharged, and a first diode coupled to said secondary winding of said transformer, said first switch driver coupled to said first totem pole driver;

a second switch driver having a second capacitor having a first and second end, said second capacitor providing storage for circuit current, a second resistor coupled in parallel to said second capacitor whereby the capacitance of said second capacitor is fully discharged, and a second diode coupled to said secondary winding of said transformer, said second switch driver coupled to said second totem pole driver;

whereby said timing signal to turn on and turn off said first and second synchronous rectifiers is transferred from said first and second switch drivers through said totem pole drivers to said first and second synchronous rectifiers.

10. The driving circuit according to claim 9 wherein said first and second synchronous rectifiers are MOSFETS.

11. The driving circuit according to claim 9 wherein said pair of totem pole drivers further include a first and a second totem pole driver, said first totem pole driver comprising a first and a second switch whereby said first synchronous rectifier is switched on and off, said second totem pole driver comprising a third and a fourth switch whereby said second synchronous rectifier is switched on and off.

12. The driving circuit according to claim 11 wherein said first, second, third and fourth switches are MOSFETS.

13. The driving circuit according to claim 9 wherein said first end of said second capacitor is connected to said first terminal of said transformer of said external circuit, whereby said second capacitor is discharged to turn on said first and second synchronous rectifiers.

14. The driving circuit according to claim 9 wherein said first end of said first capacitor is connected to said second terminal of said transformer of said external circuit, whereby said first capacitor is charged to turn on said first and second synchronous rectifiers.

15. The synchronous rectifier circuit according to claim 2 wherein said first totem pole driver comprises a first and a second switch whereby said first synchronous rectifier is switched on and off.

16. The synchronous rectifier circuit according to claim 2 wherein said second totem pole driver comprises a third and a fourth switch whereby said second synchronous rectifier is switched on and off.

17. The synchronous rectifier circuit according to claim 15 wherein said first and second switches are MOSFETS.

18. The synchronous rectifier circuit according to claim 16 wherein said third and fourth switches are MOSFETS.

* * * * *